United States Patent

Chaplin et al.

[15] 3,641,261
[45] Feb. 8, 1972

[54] NIGHT VISION SYSTEM

[72] Inventors: Richard W. Chaplin, Los Angeles; Donald J. Holscher, Playa Del Rey; Albert Wasney, Jr., Canoga Park; Bryce A. Wheeler, Los Angeles, all of Calif.

[73] Assignee: Hughes Aircraft Company, Culver City, Calif.

[22] Filed: June 4, 1969

[21] Appl. No.: 831,274

[52] U.S. Cl. ..................178/7.8, 89/41.61, 250/203
[51] Int. Cl. ..................................................H01j 29/89
[58] Field of Search .........................178/6.7–7.85; 250/203, 234; 343/6; 89/41.7, 37.5, 41.61

[56] References Cited

UNITED STATES PATENTS

| | | | |
|---|---|---|---|
| 2,359,032 | 10/1944 | Gott | 89/41.7 |
| 2,967,211 | 1/1961 | Blackstone et al. | 178/6.7 |
| 3,070,886 | 1/1963 | Tassie | 89/37.5 |
| 3,300,777 | 1/1967 | Tarr | 343/6 |
| 3,383,987 | 5/1968 | MacMillan | 89/41.61 |
| 3,417,198 | 12/1968 | Loyd | 178/6.8 |
| 3,435,140 | 3/1969 | Hueber et al. | 178/7.81 |
| 3,488,488 | 1/1970 | Crouch | 42/1 A |

Primary Examiner—Rodney D. Bennett, Jr.
Assistant Examiner—N. Moskowitz
Attorney—James K. Haskell and Walter J. Adam

[57] ABSTRACT

Night-viewing apparatus for installation on a helicopter comprising two camera heads mounted on the front of the helicopter, and a pair of pivotally mounted mirrors or prisms for each camera head to enable it to view any portion of the terrain within a wide range of look-angles. One camera head includes an image intensifier cascaded with a television camera tube whose output is displayed on a television monitor, while the other camera head includes a set of image intensifiers whose output is coupled through a fiber optic bundle to an eyepiece. A control stick moved by the pilot can control the mirror positions for one camera system, while another control stick moved by the copilot can control the mirror positions for the other camera system. Both systems are inertially stabilized, with low-frequency disturbances being corrected by signals delivered to the mirror-pivoting motors and high-frequency components of disturbances being corrected by electron beam deflection coils at the image intensifiers. A pair of weapon turrets is mounted on the helicopter, each carrying a gun and an infrared searchlight for use under very dark night conditions, and the weapon turrets can be slaved to point in the same direction being viewed at the monitor or eyepiece.

12 Claims, 13 Drawing Figures

INVENTORS.
RICHARD W. CHAPLIN,
DONALD J. HOLSCHER,
ALBERT WASNEY, JR.,
BRUCE A. WHEELER,
BY J K Haskell
ATTORNEY.

NIGHT VISION SYSTEM

BACKGROUND OF THE INVENTION

1. Field of the Invention

This invention relates to viewing systems. The invention herein described was made in the course of or under a contract or subcontract thereunder, with the Department of the Army.

2. Description of the Prior Art

The use of helicopters for reconnaissance and as platforms for gun and rocket armament has proven highly effective in guerilla war operations. Heretofore, all weapons generally have been fixed to the helicopter, necessitating pointing of the entire vehicle to aim the weapons, except for small arms which could be fired only at targets at the side of the helicopter. The weapons could be mounted for aiming independently of the helicopter in even frontal directions, by providing a motor-driven weapons turret and a viewing system for enabling an operator to see where the weapon is pointing. A viewing system could further increase the utility of the helicopter if it enabled effective night-viewing both for wide-angle reconnaissance and for accurate weapon-aiming.

Image intensifiers and infrared searchlight sensor devices have been used for night reconnaissance, and when mounted on rifles, for nighttime fire control. While guns with such viewers fixed to them could be used on a helicopter, the helicopter is subjected to vibrations which can result in a blurred image being produced at the viewer. A system which allowed viewing and aiming along a wide range of directions from the pilot or copilot seat, and which isolated the vibrations of the vehicle and guns from the viewed scene would greatly increase the utility of weapons-carrying helicopters.

OBJECTS AND SUMMARY OF THE INVENTION

An object of the present invention is to provide a night-viewing and fire-control system for use on vehicles such as helicopters, which provides clear viewing and accurate weapon-aiming over a wide angle.

Another object is to provide apparatus for use on vehicles to yield a clear and stable image, wherein the apparatus can be rapidly reoriented within a wide range.

In accordance with the present invention, apparatus is provided for use on helicopters and other vehicles for viewing the terrain over a wide angle. In one embodiment of the invention, a night-viewing and fire-control system is provided which includes a pair of vision turrets mounted on the front of the helicopter. Each turret includes a camera head whose viewing direction is fixed with respect to the helicopter, and pivotable mirrors or prisms for projecting a view of any portion of the terrain within a wide angle on the face of the camera head. One turret is part of a remote view system which displays an image on a television monitor, the direction in which the view is taken being controlled by the position of a control stick in the helicopter cockpit. The other turret is part of a direct view system which displays the image at an eyepiece, this turret being inertially controlled to point in a constant direction regardless of helicopter rotation, the direction being alterable by another control stick in the cockpit. Another pair of turrets is mounted on the sides of the helicopter, each carrying a gun and an infrared searchlight, and each being slaved on command to point in the same direction as a selected one of the turrets.

Each vision turret system includes an image intensifier that can detect visual or infrared light. The image is stabilized against rapid movements and vibrations of the helicopter by mechanical and electronic apparatus. Low frequency movements and vibrations are cancelled by servomotors which drive the vision turret, while higher frequency movements and vibrations are cancelled by electrical or magnetic deflection of the electron beam in the image intensifier. An image intensifier is utilized which allows continuous or zoom magnification to facilitate transition from wide-angle reconnaissance to detailed interrogation and precise weapon-aiming.

The vision turrets can rotate in azimuth and elevation to point within a wide range of directions. Each includes image-rotating apparatus that assures that the image on the screen or eyepiece appears right-side-up instead of tilted, even though the camera views the target area at a tilted orientation. The entire system can be switched between modes wherein the turrets move independently or both turrets follow the movements of the eyepiece display. The vision turrets are constructed in a manner similar to the weapons turrets so that the same signals can be used to drive the motors in both kinds of turrets.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
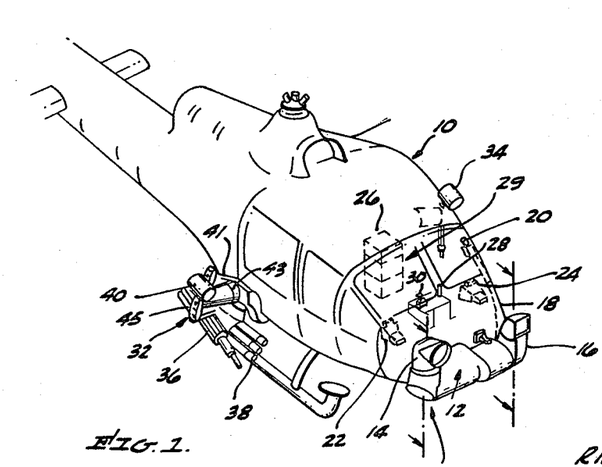
FIG. 1 is a partial perspective view of a night vision system constructed in accordance with the invention, shown installed on a helicopter.

As shown in FIG. 1, the night-viewing apparatus of the invention can be mounted on a helicopter 10 to facilitate night operations. The apparatus includes a turret mount 12 for attachment to the front of the helicopter, the mount carrying a pair of turrets 14, 16 that can pivot up and down and from side to side to view the terrain. The turret mount includes image intensifiers which view the terrain by mirrors and prisms in the turrets and display the views to operators in the helicopter. The view of the right side turret 14 is intensified and converted to an optical image that is transmitted through a flexible fiber optic bundle 18 to an eyepiece monitor 20 within the cockpit. The view of the left-side turret 16 is intensified, converted to a video signal by a television camera tube, and displayed on three television monitors within the helicopter, including a pilot monitor 22, a copilot monitor 24 and an observer monitor 26. The assembly which includes the right turret 14 and the apparatus for controlling it and presenting an intensified image of its field of view at the eyepiece 20 may be referred to as the "direct view system" (DV-system). The other assembly which includes the left turret 16 and the apparatus for controlling it and presenting intensified images of its field of view at the three monitors may be referred to as the "remote view system" (RV-system), since the television monitor screens can be viewed from a distance of several feet as opposed to the close or direct viewing required at the eyepiece.

The viewing direction of the remote view turret 16 can be controlled by a position control stick or lever 30 that is mounted on a console between the pilot and copilot. The viewing direction of the direct view turret 14 can be controlled by a rate control stick or lever 28 that is also mounted on the console. For daylight operations, the direction of the direct view turret 14, can instead, be controlled by a gunsight control 29.

A pair of weapon turrets 32, 34 are mounted on either side of the helicopter, each carrying armaments such as a machine gun 36. A rocket launcher 38 is also provided which is relatively fixed to the helicopter. An infrared searchlight 40 is also mounted on each weapon turret, to illuminate the terrain under certain night conditions where there is not enough light for adequate viewing by use of only available natural illumination. In certain modes of operation, the weapon turrets can be slaved to one of the viewing turrets, so that illumination and/or weapon firing is directed in precisely the same direction as the view of one or both of the turrets. The weapon turret 32 includes a bracket 41 fixed to the helicopter, an elevation turret portion 43 rotatably mounted on the bracket, and an azimuth turret portion 45 rotatably mounted on the elevation portion. The machine gun and searchlight are mounted on the azimuth turret portion. This construction of the turret enables location of the machine guns beyond the landing gear of the helicopter, so the guns can point downwardly. As will be pointed out below, the vision turrets 14, 16 are constructed in a similar manner, so that the same signals can be applied to the weapon and vision turret motors to point both kinds of turrets in the same direction.

Figure 2:
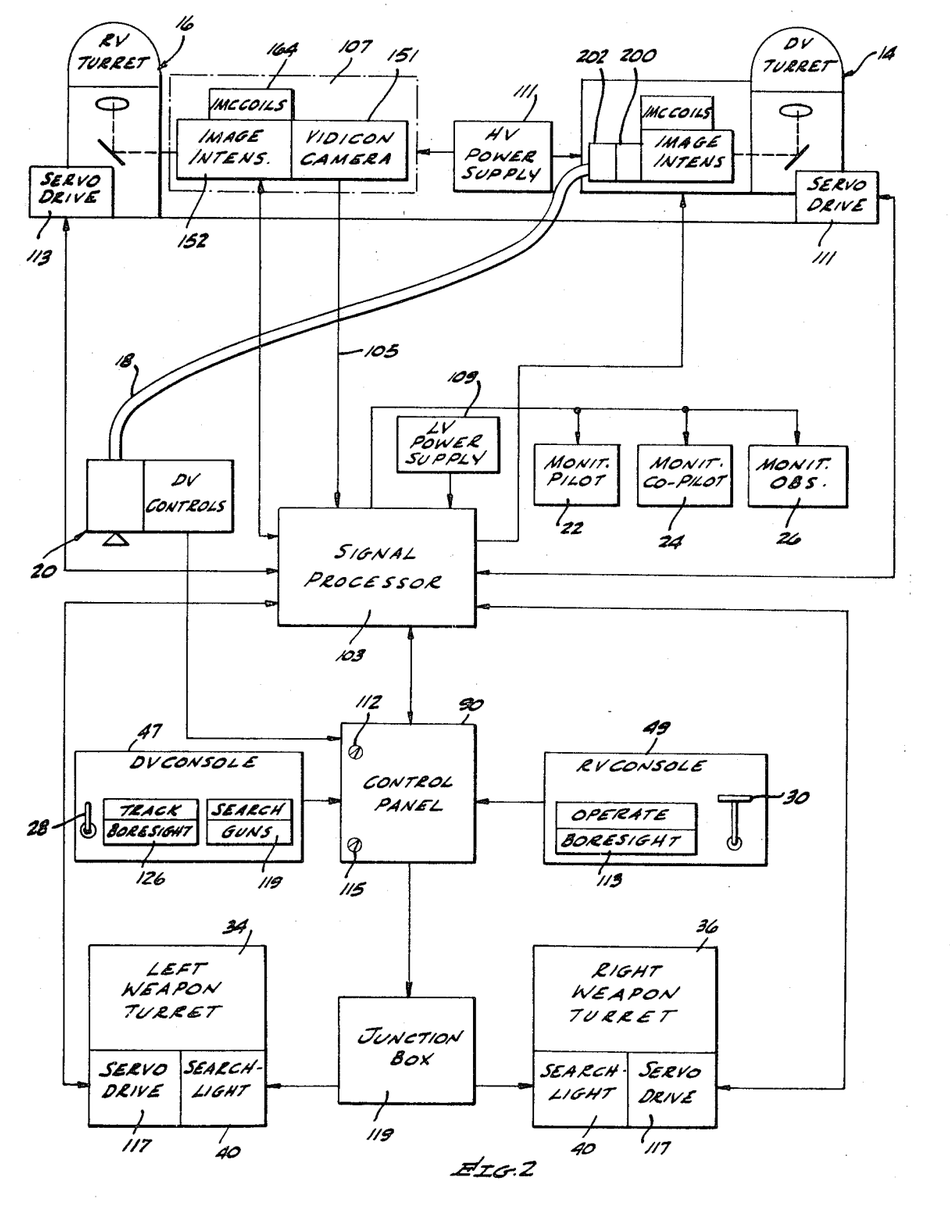
FIG. 2 is a block diagram of the night vision system of FIG. 1.

FIG. 2 is a block diagram of the system shown in FIG. 1. The copilot and pilot control the system by operating the rate control stick 28 at a DV console 47, the position control stick 30 at a RV console 49, and various switches located on a control panel 90 and at the eyepiece 20. The command signals from these controls are delivered to a signal processor circuit 103. The remote view turret 16 views the terrain and deflects light from the view to an image intensifier 152 in a camera head 107. The intensified image is viewed by a television camera tube 151 of the camera head, which delivers video signals over a cable 105 to the signal processor 103, the signal processor delivering processed video signals to the three television monitors. The camera head 107 also includes a pair of image motion compensation coils indicated at 164 for preventing image blurring. The camera head 107 receives control signals from the signal processor 103. A low-voltage power supply 109 delivers low-voltage power to the signal processor, while a high-voltage power supply 111 located in a main turret housing delivers high-voltage power to the camera head. The direct view turret 14 is constructed in a manner similar to the remote view turret, except that it employs additional image intensifiers 200, 202 instead of a television camera, and its output is transmitted through the fiber optic bundle 18 to the eyepiece.

Servo drives 111, 113 which include motors, are mounted in the turrets 14, 16. The servo drives are powered by signals from the signal processor 103, and the servo drives also return position-indicating signals to the signal processor. A similar set of servo drives 117 mounted in the weapon turrets 34, 36 receive driving signals when they have been commanded to rotate. The searchlights 40 which are mounted on the weapon turrets receive power through a junction box 119 which is controlled through the control panel 90.

FIGS. 4 through 7 illustrate the hand controls and displays of the night-viewing apparatus. The eyepiece 20 shown in detail in FIG. 5, carries several controls for adjusting the display therein. These include a brightness control 42 for adjusting the brightness of image presented at the eyepiece 44, a diopter-adjusting control 46 for adapting the eyepiece to the eye of the particular operator, a field of view switch 48 for varying the field of view and magnification of the image, and a focus switch 50 for permitting sharp focus of close or distant objects. In daylight operations, the terrain may be viewed directly, and the eyepiece 30 and controls thereon may then be stowed on a bracket 52 in the cockpit. During such daylight control, the copilot may control the direct view turret by turning a handle 58. In night operations, the eyepiece is fastened to a housing 54 which the copilot can position for ease of viewing.

Figure 3:
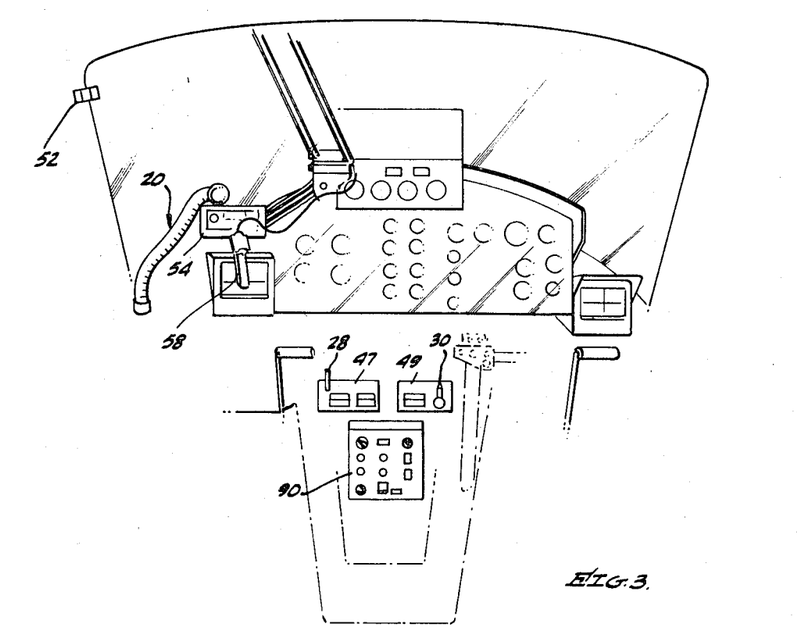
FIG. 3 is a perspective view of the system of FIG. 1, as seen from the cockpit of the helicopter.

The rate control stick 28, shown in FIG. 3, has a constant position, but the copilot can exert forces on it to change the position of the direct view turret 14. Pressure sensors positioned against the stick produce signals that turn the DV-turret at a rate dependent upon how hard the copilot presses on the stick, and in the direction in which the stick is pressed. When pressure on the stick 28 is no longer applied, the turret stops rotating. It thereafter maintains a constant viewing angle, regardless of rotation of the helicopter. Thus, once the copilot acquires a target, he can maintain a "fix" on the target in spite of rapid helicopter maneuvering, without touching the stick (except for occasional slight corrections).

Figure 4:
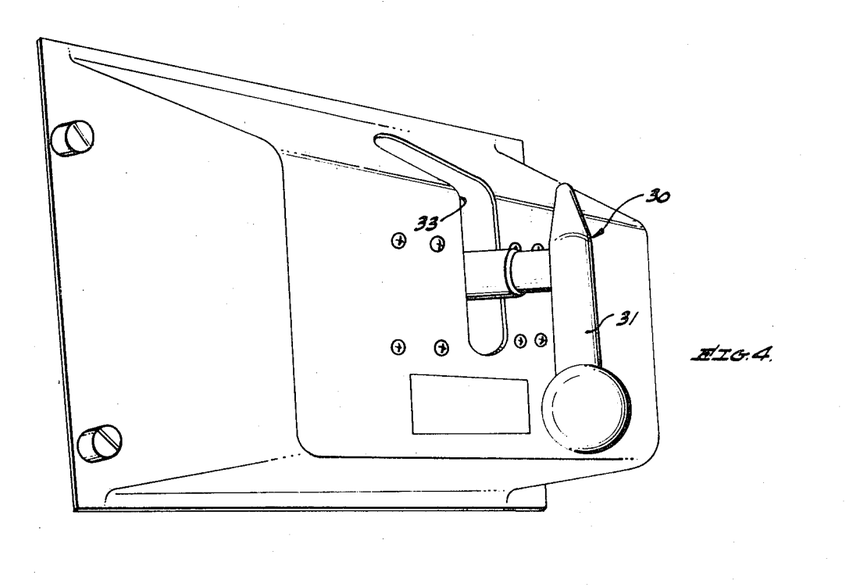
FIG. 4 is a perspective view of the position control stick of the system.
Figure 5:
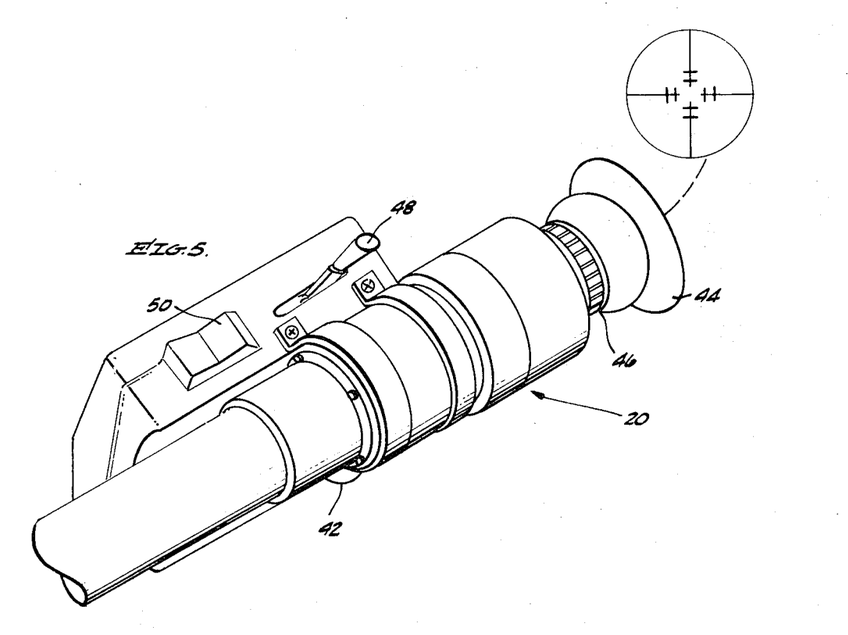
FIG. 5 is a perspective view of the eyepiece apparatus of the system.

The position control stick or lever 30, which is shown in detail in FIG. 4, can be moved by the pilot to move the remote view turret 16 in corresponding directions. The stick 30 has a handle 31 at its upper end for grasping by the operator, to permit rotation of the stick around its axis. The stick can be moved forward or backward along a slot 33 to point the remote view turret down or up, and can be rotated to turn the turret to the left or right. The lever is friction mounted so it remains in the last positioned when released. When the position stick 30 is released, the remote view turret maintains a constant viewing position with respect to the helicopter. (Unlike the direct view turret, it does not remain on target if the helicopter rotates.) The construction of stick 30 facilitates pilot orientation when he grasps the handle 31, since he can tell by the position of the handle approximately in what direction (elevation and azimuth) the remote view turret is pointing, and therefore the region of the terrain displayed on his monitor.

Figure 6:
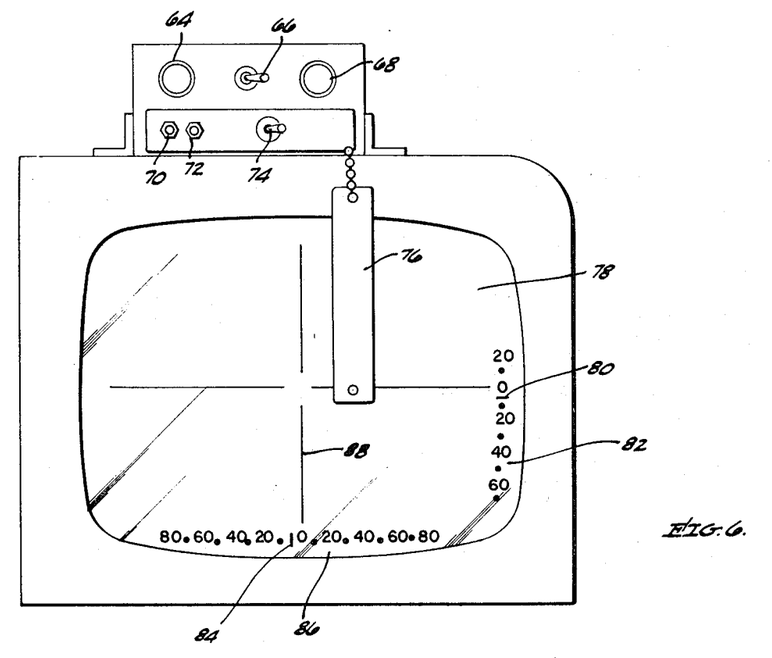
FIG. 6 is a front elevation view of a television monitor of the system.

The pilot and copilot television monitors 22, 24 are identical, and one of them is shown in detail in FIG. 6. A brightness control 64, on-off switch 66, and contrast control 68 are provided, which can be operated during a mission. Horizontal and vertical controls 70, 72 for preventing rolling of the picture across the screen, and a sync switch 74 for enabling synchronizing signals to be taken from an external test input or from the video signal, are operated prior to the start of the mission, and they are covered by a cover 76 during the mission. The screen 78 displays a bar 80 which can move along an elevation scale 82 to indicate the elevation angle at which the remote view turret is pointed. Another bar 84 can move along an azimuth scale 86 to indicate the azimuth angle at which the turret is pointed. A set of crosshairlines 88 which appears on the screen provides a sighting reference for aiming the weapon turrets. The observer television monitor is similar to that of the pilot and copilot, except that it is larger.

Figure 7:
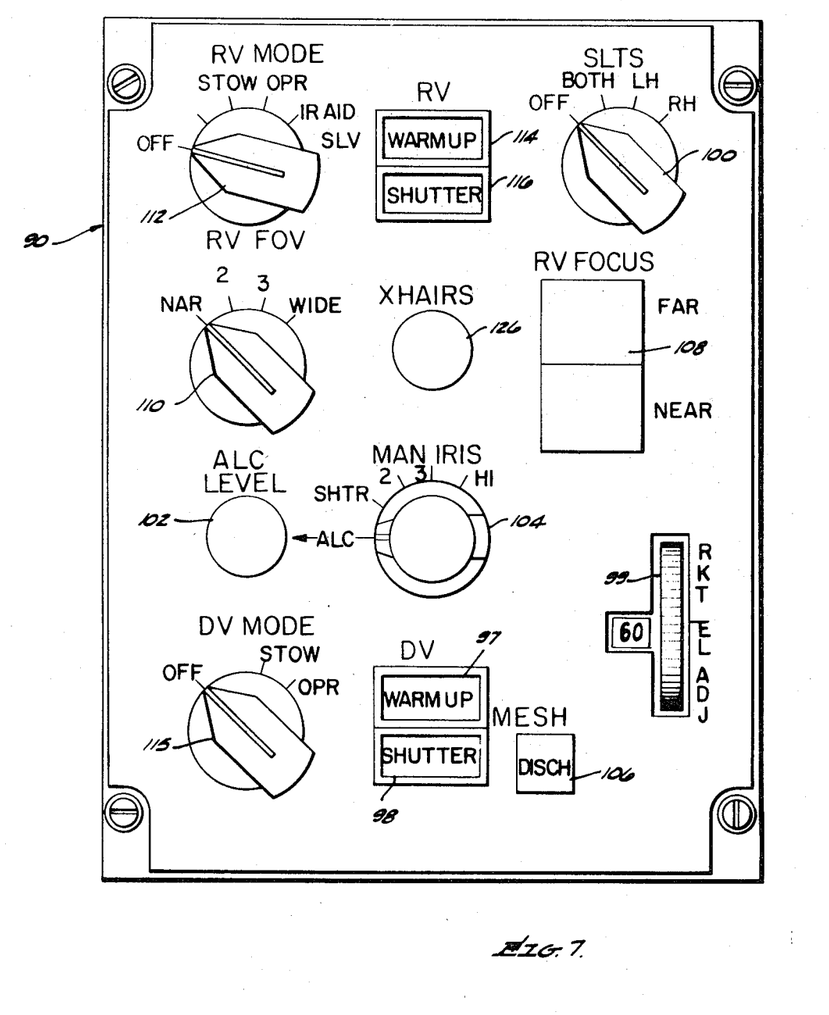
FIG. 7 is a front elevation view of a control panel of the system.

FIG. 7 illustrates details of the control panel 90 which contains several switches and indicators for the system. An RV-mode switch 112 enables selection of four modes of operation in addition to an "OFF" state. In a "STOW" position of the switch, the RV-turret turns to point inboard, to prevent damage from debris when the system is not being used. In an "OPR" or Operate position, the RV-turret may be controlled by the position control stick 30, or may be pointed straight ahead to a boresight position, as will be described below. The "IR AID" position is similar to the Operate position, except that in addition, the weapon turrets are slaved to follow the RV-turret. For a "SLV" or Slave position, the RV-turret is slaved to follow the DV-turret.

A boresight mode is provided for, wherein the RV-turret turns to point straight ahead toward a predetermined direction with respect to the helicopter. This mode is useful in aiming the rocket launchers 38 which are almost fixed in position. The boresight mode can be realized when the switch 112 is in the "OPR" position, by also controlling an illuminated pushbutton 113 on an RV-console 49 shown in FIG. 2. When the button 113 is in a state wherein a "BORESIGHT" strip thereon is illuminated, the RV-turret is automatically turned to the straight-ahead position. If the button 113 is pushed, the "OPERATE" strip thereon is illuminated and the system changes to a mode wherein the RV-turret follows the position control stick 30. Pushing the button 113 again makes the system revert to the boresight mode.

The control panel of FIG. 7 also has a DV-mode switch 115 which enables selection of two general modes of operation in addition to an "OFF" state. In a "STOW" position of the switch, the DV turret points inboard. In an "OPR" or Operate position, the DV-turret may be commanded by the rate control stick 28, or may be automatically turned to a straight-ahead boresight position, depending upon the operation of a switch 126 on the DV-console 47 shown in FIG. 2. Assuming the mode switch 115 is in the "OPERATE" position, then if a "TRACK" strip is illuminated on switch-indicator 117, the DV-turret will be commanded by the rate stick 28. If the switch 117 is thereafter pushed, so that the "BORESIGHT" strip thereon is illuminated, the DV-turret automatically turns to point in the straight ahead boresight position. The DV-console 47 also contains a "SEARCH-GUNS" switch 119 which slaves the weapon turrets to the DV-turret when the "GUNS" strip is illuminated, and which uncouples the weapon turrets from the DV-turret when the "SEARCH" strip is illuminated. The switch 119 is alternated between the "SEARCH" and "GUNS" states by pressing it.

The control panel of FIG. 7 has several other switches and indicators for the system. A warmup light 114 indicates that the RV-system is warming up, and a shutter indicator 116 indicates when the remote view system shutter is closed. A searchlight switch 100 can be rotated to turn off both infrared searchlights, to turn on both searchlights, or to turn on only the left or right side searchlight. A field of view control 110 allows selection of four fields of view and corresponding magnifications for the remote view system, the wider views corresponding to the lower magnifications. A crosshair adjuster 126 allows control of crosshair illuminations on the monitors. A focus switch 108 can be momentarily pushed up or down to focus the RV-system on more distant or closer objects, respectively. An automatic light control level adjust 102 selects the reference level for an automatic iris control circuit that controls the amount of light reaching the remote view camera. A manual iris control 104 allows choosing between the automatic iris control circuit or manual adjustment, and permits manual control of the iris opening. A warmup indicator 97 indicates when the DV-system is ready to operate, while a shutter indicator 98 indicates when the shutter on the direct view camera is closed to protect the camera at high light levels. A discharge switch 106 can be pressed to discharge a mesh on the remote view image intensifier when a flash of light causes an image tube "crossover" condition. A rocket-elevation-adjusting knob 99 allows slight changes in the elevation of the rocket launchers 38, which is desirable to enable accurate aiming of the rockets without necessitating control of helicopter tilt.

Some of the basic modes of operation of the system are presented in the following table.

| Mode | Manner of Operation |
|---|---|
| 1. RV Operate | RV turret position commanded by RV hand control (stick 30) |
| 2. RV Operate-Boresight | RV turret commanded to preset zero position (however, increments of elevation commanded by rocket elevation adjust knob 99) |
| 3. RV-IR Aid | RV turret and weapon turrets commanded by RV hand control (stick 30) |
| 4. RV Stow | RV turret moves to stow position |
| 5. DV Operate-Track-Search | DV turret follows rate command of DV hand control (stick 28) |
| 6. DV Operate-Track-Guns | DV turret and weapon turrets follow rate command of DV hand control (stick 28) |
| 7. DV Operate-Boresight | DV turret commanded to zero position |
| 8. DV Stow | DV turret moves to stow position |
| 9. RV Slaved to DV-Track-Search | DV turret follows rate command of DV hand control, while RV turret is slaved to DV turret position |
| 10. RV Slaved to DV-Track-Search-Guns | DV turret follows rate command of DV hand control, while RV turret and weapon turrets are slaved to DV turret position |
| 11. RV Slaved to DV-Boresight | DV turret commanded to preset zero position, while RV turret is slaved to DV turret position |

Figure 8:
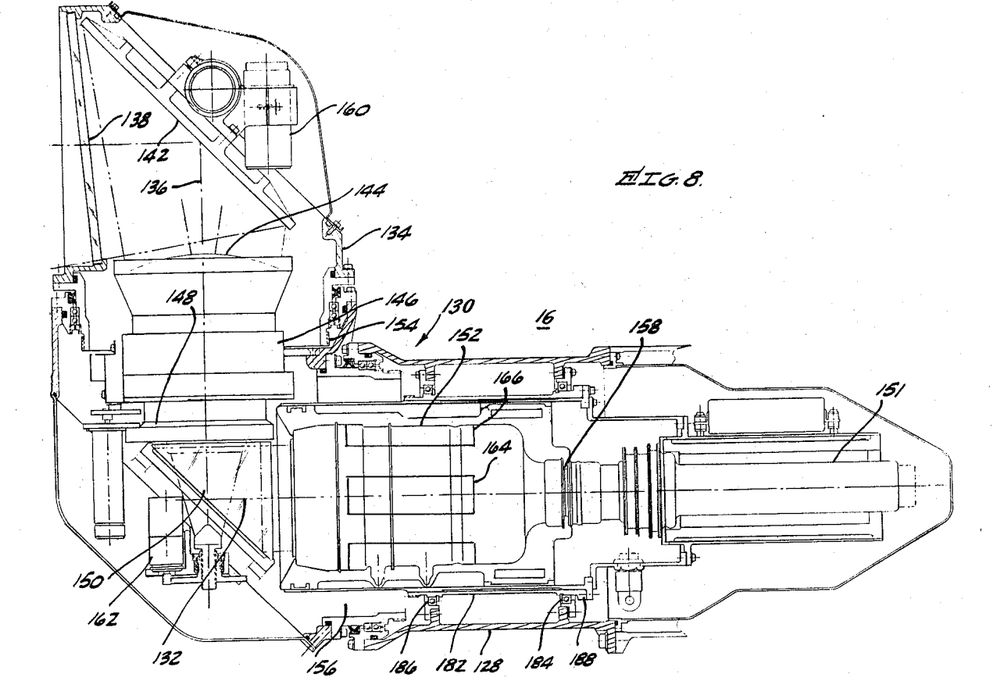
FIG. 8 is a sectional front view of the remote view camera of the system.

FIG. 8 illustrates some of the details of the remote view turret 16, which is shown in a position where it points horizontally and toward the left of the helicopter. The turret includes a main turret housing portion 128 fixed to the front of the helicopter, an elevation housing portion 130 which can rotate about a horizontal axis 132 of the main turret housing, and an azimuth housing portion 134 which can rotate about the axis 136 of the elevation housing portion. Light from the target enters a window 138 and is reflected by a mirror 142 through an objective lens 144. The light passes through an iris at 146 and shutter at 148, and is deflected by a prism 150. Light from the prism passes through a reticle into a zoom image intensifier 152 which magnifies and intensifies the image. The output of the zoom intensifier is viewed by a television camera tube 151, which produces video signals that are delivered through electrical cables (and a signal processor) to the three remote view television monitors.

Figure 9:
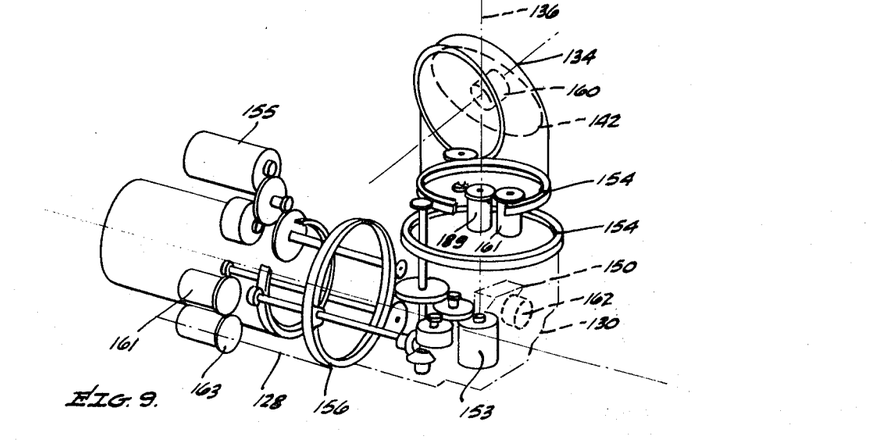
FIG. 9 is a partial perspective view of the camera of FIG. 8 showing the mechanical components thereof.

As also shown in FIG. 9, which illustrates some of the mechanical components of the remote view system, rotation of the azimuth-housing portion 134 is accomplished by an azimuth motor 153 mounted on the elevation-housing portion 130, which drives a gear 154 on the azimuth-housing portion. The focusing of the lens 144 on near or far objects is accomplished by a focus motor (not shown) which moves it along the axis 136 of the elevation housing. The angular position of the elevation housing is controlled by an elevation motor 155 on the main turret housing, that drives a gear 156 on the elevation housing. Gyros 160 and 162 on the mirror 142 and prism 150 sense disturbances of the helicopter, and provide signals to stabilize the turret against such disturbances. Tachometers 161 and 163 are also provided to sense rate of turret rotations.

The zoom image intensifier 152 of FIG. 8 produces an intensified light image of variable magnification at a phosphor screen 158. The television camera 151 views the image at the phosphor screen and produces an image at the three television monitors in the helicopter, the images being of increased brightness.

The turrets are subject to vibrations and disturbances that could result in a blurred image at the monitors. Low frequency vibrations are especially severe during firing of the weapons, but vibrations over a wide range of frequencies are always present during flight. Two motion-compensation systems are employed, one being a mechanical system that drives the azimuth and elevation motors to compensate for low frequency motion, and the other being an electronic system which shifts the electron beam in the image intensifier 152 to compensate for high frequency motions.

Figure 10:
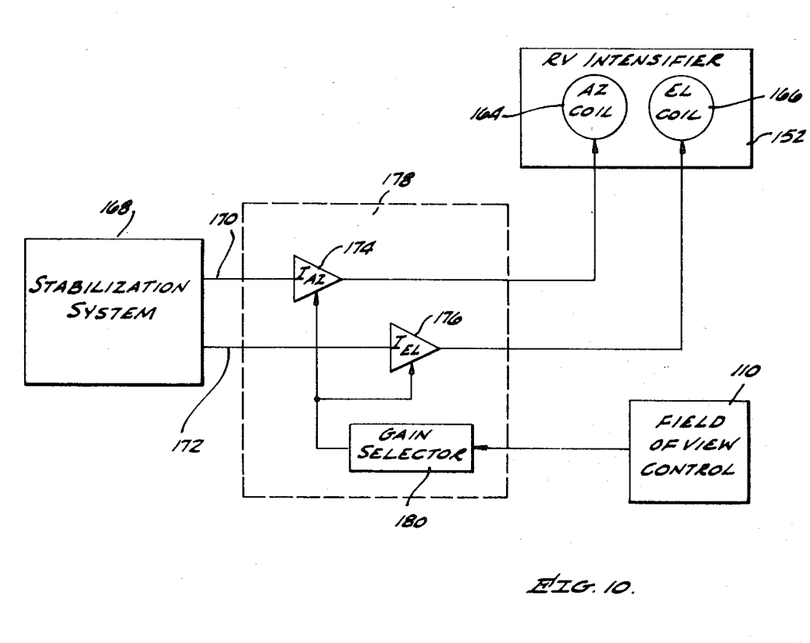
FIG. 10 is a simplified schematic diagram of the electronic image stabilization apparatus of the remote view turret.

The electronic compensation system stabilizes the image by use of a pair of deflection coils 164, 166 around the image intensifier 152 to deflect the electron beams so as to cancel out disturbances. As shown in FIG. 10, the deflection coils are controlled by the outputs of a stabilization system 168, which delivers signals over lines 170 and 172 representing the high frequency residual inertial errors sensed by the gyros, line 170 carrying the azimuth component and line 172 carrying the elevation component of the inertial error. The signals on these lines 170, 172 are delivered to amplifiers 174, 176 in a control circuit 178. The gain of these amplifiers is controlled by a signal from gain selector 180. The gain selector 180, which changes the gain of amplifiers 174 and 176, delivers a signal to match the gain change in the intensifier due to the field of view and magnification selected by the operator at the control panel described above. The signals from amplifiers 174, 176 are delivered to the azimuth and elevation coils 164, 166 in the image intensifiers 152.

Figure 11:
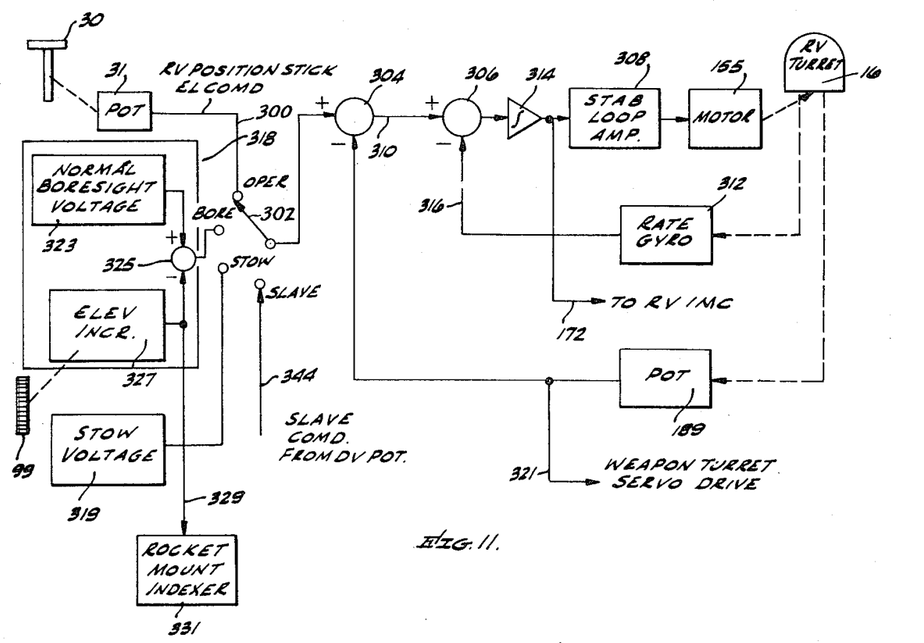
FIG. 11 is a simplified schematic diagram of the elevation stabilization apparatus for the remote view turret.

FIG. 11 is a simplified diagram of the circuit which stabilizes the remote view system in elevation. Another similar circuit is used to stabilize the RV-system in azimuth. These circuits eliminate blurring of the image displayed on the television monitors, in spite of vibrations and other disturbances in the helicopter. If the RV-system is in a mode where the RV turret is being commanded by the position stick 30, then a potentiometer 31 coupled to the stick produces a voltage over line 300 which commands a particular elevation angle for the RV-turret. The signal passes through a switch 302 to a summing junction 304, to produce signals that pass to another summing junction 306, an integrator 314, a stabilization loop-amplifier 308, and the motor 155 that drives the RV-turret in elevation. The elevation angle of the turret is sensed by the potentiometer 189, which delivers a voltage to junction 304, so that the output 310 of the junction represents the difference between the commanded position and the actual position of the turret. Of course, this difference approaches zero as the turret attains the commanded position.

The position of the RV-turret 16 (actually the position of the prism in the elevation-housing portion thereof) is sensed by a rate gyro 312. The gyro output, which represents the rate of any sudden disturbance or vibration, is delivered over line 316 to the summing junction 306, to add a signal of a polarity and amplitude that will cancel sudden disturbances and vibrations. The stabilization signal delivered over line 316 to the summing junction 306 can only stabilize the turret mechanically, that is, by driving the motor 155 in a direction to cancel disturbances. Higher frequencies vibrations cannot be mechanically cancelled. To cancel these disturbances, the signal from the integrator 314 is delivered over the line 172 to one of the deflection coils 164 in the image intensifier to electronically stabilize the image in the manner illustrated in FIG. 10.

If it is desired to turn the RV-turret to the boresight position, then switch 302 is operated to connect a voltage from boresight source 318 to summing junction 304. Boresight 318 includes a normal boresight voltage source 323 which supplies a voltage of a level which commands the turret to a preset elevation position (another boresight source commands the boresight azimuth position). Voltage from nominal normal source 323 passes through a summing junction 325 to the switch 302. The boresight source 318 also includes an elevation increment source 327 which is adjustable by the rocket elevation adjust knob 99 to incrementally add a small additional voltage to summing junction 325. This allows slight changes in elevation to aim the rockets without tilting the helicopter. The output of elevation source 327 is also delivered over line 329 to an indexer 331 on the rocket mount to slightly alter its elevation.

In a similar manner, if it is desired to turn the RV-turret to the stow position, then switch 302 is operated to connect a stow voltage source 319 to summing junction 304 to command the turret to the stow elevation position. For still another mode of operation, where the RV-turret is to be slaved to the DV-turret, the switch 302 is operated to connect a line 344 which carries slave command signals from a DV-system potentiometer to the summing junction. As pointed out above, the weapon turrets can be slaved to the RV-turret, and this is accomplished by delivering signals from the RV-potentiometer 189 over line 321 to the elevation motor of the weapon turrets (corresponding signals also must be delivered to the azimuth motors of the weapon turrets).

Figure 12:
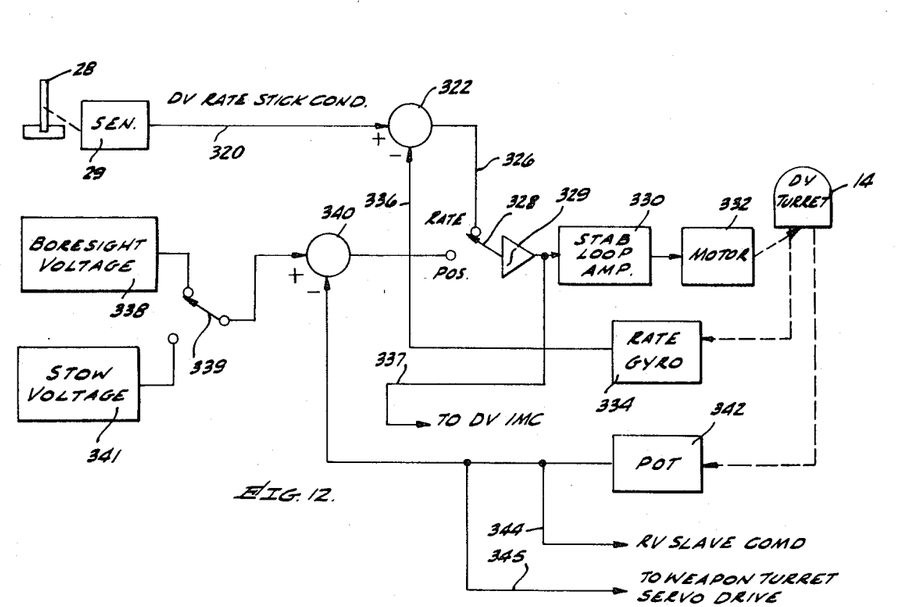
FIG. 12 is a simplified schematic diagram of the elevation stabilization apparatus for the direct view turret.

FIG. 12 is a simplified diagram of the circuit which stabilizes the direct view system in elevation. This circuit not only eliminates blurring of the image displayed at the eyepiece, but maintains the DV-turret in an inertially stabilized position regardless of rotation of the helicopter. If the DV-system is in a mode wherein the DV-turret 14 is being commanded by the rate stick 28, then a pressure sensor 29 coupled to the stick produces a voltage over line 320 which commands a particular direction and rate of change of the DV-turret position (in elevation). This voltage enters a summing junction 322 whose output is delivered over line 326 through switch 328, to an integrator 329 whose output is coupled to a stabilization loop-amplifier 330. The output of the amplifier drives a motor 332 that can change the elevation of the DV-turret 14. A rate gyro 334 senses changes in the elevation of the DV turret and delivers a signal over line 336 to the summing junction 322. Thus, the output of junction 322 represents the rate of change commanded by the stick 28, but corrected to cancel any turret disturbances which have not been commanded. The output of integrator 329 is also delivered over line 337 to an electron beam deflection coil located at the DV-image intensifier, to deflect the electron beam in a direction to cancel high frequency disturbances that cannot be cancelled by mechanically driving the motor 332.

When it is desired to point the DV-turret in the boresight direction, switch 328 is switched from the rate configuration illustrated in FIG. 12 to a Position configuration. Then, voltage from a boresight voltage source 338 can be conducted through a switch 339 to summing junction 340, to provide signals that pass through switch 328 to integrator 329, to amplifier 330, to command the operation of motor 332. The position of the DV-turret 14 with respect to the helicopter is sensed by a potentiometer 342 whose output is delivered to summing junction 340. Thus, the output of junction 340 is a voltage representing the difference between the commanded boresight position and the actual position of the turret. If it is desired to point the DV-turret in the inboard or stow direction, switch 339 is operated to connect signals from a stow voltage source 341 instead of from the boresight source. As mentioned earlier, the RV-turret and weapon turrets can be slaved to the DV-turret, which is accomplished by connecting the output of DV-potentiometer 342 to the RV-turret over line 344 and to the weapon turret over line 345.

The axes of the elevation and azimuth housing portions 130, 134 of the remote view turret are identical to those of the weapon turrets. This permits the same signals which are used to drive the elevation and azimuth motors 155, 153 of the vision turret, to be used to drive corresponding motors of the weapon turrets, to accurately slave the weapon turrets to the vision turret. However, the fact that the azimuth housing is mounted on the elevation housing instead of visa versa results in the view being tilted when a turret rotates in both elevation and azimuth away from a dead-ahead position. If the tilted view were presented on the monitor and eyepiece, it would disorient the persons observing the view. Ideally, vertical objects such as flagpoles should always extend vertically on the monitors and eyepiece so long as the helicopter is level. To eliminate tilted views, a derotation system is included. As shown in FIG. 8, the camera head which includes the television camera 151 and image intensifier 152, is mounted on a housing 182 that is supported on bearings 184, 186 on the main turret housing 128. A gear 188 fixed to the housing 182 is driven by a motor (not shown) on the main turret housing to pivot the camera head in a direction to cancel tilting of the view, so that the output of the television camera 151 represents an erect view.

The direction and amount of camera head rotation required for derotation of the image depends upon the angles of rotation of the azimuth housing portion 134 and elevation-housing portion 130. These are sensed by the pair of potentiometers 189, 191 whose outputs are also used in the stabilization apparatus. The derotation angle to which the camera must be driven is determined by the outputs of the two potentiometers 189, 191. The actual angle of rotation of the camera is sensed by a derotation potentiometer coupled to gear 188 which is driven by the derotation motor. A derotation circuit receives the output of the azimuth and elevation potentiometers 189, 191 and produces a signal proportional to the required derotation angle. The output of the derotation circuit is compared to the output of the derotation potentiometer, and the difference signal is used to drive the derotation motor in a direction to reduce the difference.

Figure 13:
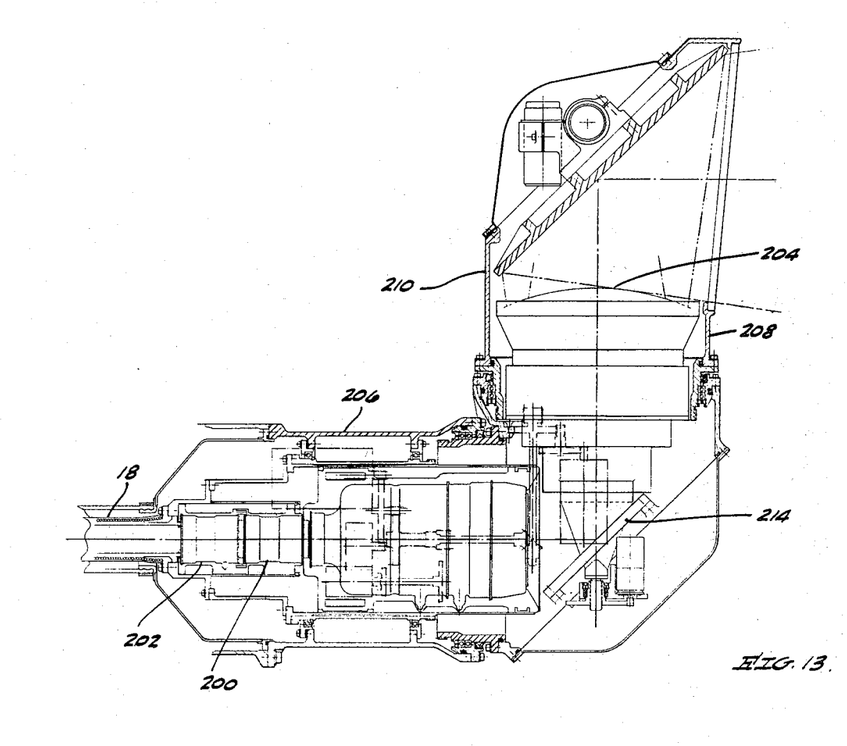
FIG. 13 is a sectional, front view of the direct view turret of the system of FIG. 1.

The direct view system, illustrated in FIG. 13, is largely similar to the remote view system described above, except that a pair of additional image-intensifier stages 200, 202 are used instead of a television camera tube, and the output of the last intensifier stage 202 is delivered through the fiber optic bundle 18 to the eyepiece instead of over electrical cables to television monitors. The direct view system is also provided with a larger diameter objective lens 204 to increase the image intensity. Otherwise, the system is similar, including a main turret housing 206 and elevation and azimuth housing portions 208, 210, with mirrors, prisms or other mirror means 212, for deflecting light to the image intensifiers.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A vision system comprising:
   a rotatably mounted visual turret apparatus for viewing a scene; said visual turret apparatus including a main turret housing, an elevation-housing portion, and an azimuth-housing portion, a first of said housing portions rotatably mounted on said main turret housing and a second of said housing portions rotatably mounted on said first housing portion, said visual turret including second mirror means mounted in said second housing portion for deflecting light from the view to said first housing portion, and also including first mirror means mounted on said first housing portion for deflecting light from said second mirror means to said main housing;
   motor means for positioning said turret apparatus;
   monitor means positioned remotely from said turret apparatus;
   means for producing, for viewing at said monitor means, an image of the scene viewed by said turret apparatus including an image intensifier mounted on said main housing to receive light from said second mirror means;
   manual control means at the location of said monitor means coupled to said motor means for manually controlling the orientation of said turret apparatus from said monitor means location;
   a weapon turret apparatus for holding an aimable weapon; and
   means for selectively slaving said weapon turret apparatus to point in the same direction as said visual turret apparatus, and uncoupling said weapon turret apparatus from said visual turret apparatus.

2. A vision system comprising:
   a rotatably mounted visual turret apparatus for viewing a scene;
   motor means for positioning said turret apparatus;
   monitor means positioned remotely from said turret apparatus;
   means for producing, for viewing at said monitor means, an image of the scene viewed by said turret apparatus;
   manual control means at the location of said monitor means coupled to said motor means for manually controlling the orientation of said turret apparatus from said monitor means location;
   a weapon turret apparatus for holding an aimable weapon;
   means for selectively slaving said weapon turret apparatus to point in the same direction as said visual turret apparatus, and uncoupling said weapon turret apparatus from said visual turret apparatus;
   means for inertially stabilizing said visual turret including servo drive means for turning said weapon turret, and means responsive to the position of said vision turret for driving said servo drive means, whereby to provide inertial stabilization for said weapon turret.

3. In a vehicle with a cockpit for holding a first operator who can fire a weapon and a second operator who can pilot the vehicle, the improvement comprising:
   first and second vision turrets;
   means for mounting said turrets on said vehicle to enable movement independent of each other to independently point in a variety of directions;
   first and second monitor means for mounting in said cockpit, for viewing by said first and second operators, respectively;
   means for displaying the views of said first and second turrets at said first and second monitor means, respectively;
   first and second controls for moving said first and second turrets, respectively, said first and second controls located for operation by said first and second operators as they view said first and second monitor means, respectively;
   a weapon turret mounted on said vehicle for holding an amiable weapon; and
   means for slaving said weapon turret to said first turret, whereby to enable the first operator to aim the weapon with one vision turret while the second operator pilots the vehicle with another vision turret.

4. The improvement described in claim 3 wherein:
   said first turret is inertially stabilized to maintain a substantially constant orientation with respect to the terrain regardless of vehicle-maneuvering, without position-adjusting by said first control; and
   said second turret is position stabilized to maintain a substantially constant orientation with respect to the vehicle, whereby said first operator can maintain the weapon fixed on a target in spite of vehicle-maneuvering while the second operator can see in the direction the vehicle is headed.

5. The improvement described in claim 4 wherein:
   said first control comprises pressure-sensitive means for commanding a direction and rate of change of said first vision turret position in accordance with forces manually applied thereto; and
   said second control comprises a manually positionable member for commanding the position of said second vision turret in accordance with the position of said member.

6. The improvement described in claim 3 including:
   means for selectively slaving said second turret to follow said first turret, and uncoupling said second turret from said first turret.

7. In a vehicle with a cockpit for holding an observer, the improvement comprising:
   a vision turret for mounting on the outside of said vehicle to point in a variety of directions;
   monitor means located remotely from said vision turret for viewing by an observer in said cockpit;
   means for coupling the view of said vision turret to said monitor means;
   means for inertially stabilizing said vision turret to point in a direction independent of turning of said vehicle;
   a rate control member located within said cockpit for receiving manual forces from said observer; and
   means responsive to the amplitude and direction of force applied to said rate control member for altering the direction of said vision turret at variable rates and directions.

8. The improvement described in claim 7 including:
   a weapon turret for mounting on said vehicle to hold an aimable weapon; and
   means responsive to the position of said vision turret with respect to said vehicle, for aiming said weapon turret in the same direction as said vision turret, whereby to enable maintaining a weapon on a target regardless of vehicle-turning.

9. In a helicopter with a cockpit for holding a pilot and copilot, the improvement comprising:
   a main turret housing for mounting on the front of said helicopter;
   first and second elevation-housing portions pivotally mounted at spaced locations on said main turret housing;

first and second azimuth-housing portions pivotally mounted on said first and second elevation-housing portions, respectively;

azimuth mirror means mounted on each of said azimuth-housing portions and elevation mirror means mounted on each of said elevation-housing portions for deflecting light beams into said main turret housing;

a pair of image-intensifier means mounted in said main turret housing for respectively receiving the light beams from said mirror means in said first and second elevation-housing portions;

a television camera mounted in said main turret housing for viewing the image of a first of said image-intensifier means and producing video signals representative thereof;

a television monitor mounted in said cockpit;

means for applying said video signals to said television monitor to be displayed thereby;

an eyepiece in said cockpit; and a fiber optic bundle having one end coupled to said second image-intensifier means and a second end coupled to said eyepiece for enabling said eyepiece to view the output of the second of said pair of image intensifiers.

10. The improvement described in claim 9 including:

means for coupling said elevation and azimuth-housing portions so that the mirror means in both of said azimuth-housing portions point in the same direction and the mirror means in both of said elevation-housing portions point in corresponding directions, whereby to slave one turret to the other.

11. The improvement described in claim 9 including:

a weapon turret with an aimable weapon thereon; and means for selectively slaving said weapon turret to point in the same direction viewed by a selected one of said azimuth mirror means.

12. The improvement described in claim 9 including:

a turret with a searchlight thereon for mounting on said helicopter; and means for selectively slaving said turret on which said searchlight is mounted to point in the same direction viewed by a selected one of said azimuth mirror means.

* * * * *